United States Patent [19]
Barat et al.

[11] Patent Number: 5,493,918
[45] Date of Patent: Feb. 27, 1996

[54] METHOD AND CONTACTLESS MEASURING DEVICE FOR THE TENSION OF A FILAMENT

[75] Inventors: Eric Barat, Paris; André Salles, Plaisir, both of France

[73] Assignee: Commissariat A L'Energie Atomique, Paris, France

[21] Appl. No.: 163,350

[22] Filed: Dec. 6, 1993

[30] Foreign Application Priority Data

Dec. 7, 1992 [FR] France ................................. 92 14703

[51] Int. Cl.$^6$ ................................................. G01L 5/10
[52] U.S. Cl. ................................................. 73/862.41
[58] Field of Search ........................ 73/509, 518, 704, 73/768, 862.41, 160; 324/160, 163, 176, 178, 663, 679, 681, 683, 690

[56] References Cited

U.S. PATENT DOCUMENTS

| | | |
|---|---|---|
| 3,312,892 | 4/1967 | Parnes . |
| 3,871,217 | 3/1975 | Miley ................................. 73/862.41 |
| 4,311,958 | 1/1982 | Aeppli ..................................... 73/160 |
| 4,568,875 | 2/1986 | Piso et al. . |
| 4,706,014 | 11/1987 | Fabbri ..................................... 73/160 |

FOREIGN PATENT DOCUMENTS 2185105  7/1987  United Kingdom ................... 324/178

OTHER PUBLICATIONS

Nuclear Instruments and Methods in Physics Research, vol. A281, n°3, pp. 652–653.
French Search Report–FR9214703–FA483226–Aug. 5, 1993.

Primary Examiner—Robert Raevis
Attorney, Agent, or Firm—Pearne, Gordon, McCoy & Granger

[57] ABSTRACT

Method and its devices for the contactless measurement of the tension and/or travel speed of an insulating filament, thread or wire. The method consists of processing the signal $$\frac{C1 - C2}{C1 + C2},$$

in which C1 and C2 are the capacitances of a capacitive dipole. For the filament tension measuring device, the dipole (3) is defined by a pair of electrodes (4a/4b) of the same size and having a triangular shape and by a common electrode (2), processing consisting of extracting the vibration frequency of the filament between two supports by a spectral analysis. The speed measuring device comprises two dipoles (13,17), each defined by a pair of rectangular electrodes (14a/14b, 18a/18b) and a common electrode (12,16), processing consisting of extracting the passage time, between the two dipoles, of microscopic irregularities of the filament by an intercorrelation. The invention has application to the textiles field and particularly to the spinning of textile filaments.

1 Claim, 2 Drawing Sheets

METHOD AND CONTACTLESS MEASURING DEVICE FOR THE TENSION OF A FILAMENT

BACKGROUND OF THE INVENTION

The invention relates to a method and to its devices making it possible to measure the tension and/or travel speed of an insulating filament, fibre, thread or wire without any contact with the latter. This device has numerous applications in all fields where it is necessary to know the value of the tension or travel speed of an insulating filament. More specifically, the invention applies to the textile field and more specifically to the spinning of textile filaments.

There are various methods for determining the movement or transit speed of a filament. One of these methods consists of evaluating the linear speed of the filament on the basis of the radius of the grooved pulley serving as the filament guide and the number of revolutions per second carried out around said grooved pulley.

The main disadvantage of this method is that it introduces significant errors on the measurement when the grooved pulley is worn. Moreover, it does not make it possible to take account of possible slipping of the filament on said grooved pulley.

Another known method makes it possible to measure the tensions of a textile structure held taut on one site. Such a method consists of supplying an excitation sinusoidal signal on a circular textile surface and measuring the displacement response with the aid of a contactless sensor or transducer. A transfer function curve or spectral signature can then be deduced. This method is more specifically defined in the article entitled "Measure tensions within the cloth" by Jean-Yves Catherin, published in BUREAUX D'ETUDES, No. 76. However, this method only applies to woven structures.

SUMMARY OF THE INVENTION

The present invention therefore has the advantage of proposing a method and its performance devices making it possible to measure one or other of the filament movement speed and the tension of said filament or both simultaneously, whilst obviating the disadvantages of the previously described, known methods.

More specifically, the invention relates to a method for the contactless measurement of the tension and/or movement speed of an insulating filament with the aid of a contactless sensor, characterized in that said sensor having first and second flat conductor means separated by an air layer of permittivity p in which the filament moves, it consists of determining disturbances to the permittivity of the air layer due to fluctuations in the weight per unit length and the position of the filament during its movement in said air layer.

A first device for performing this method is a device for the contactless measurement of the tension of an insulating filament. In said device, the first flat conductor means have a common electrode and the second flat conductor means have a pair of electrodes forming with the common electrode a capacitive dipole of respective capacitances C1 and C2, said electrode pair having a first and a second electrodes, each having a complementary right-angled triangle shape.

Advantageously, said device has processing means for determining, by a spectral analysis of a signal $$\frac{C1 - C2}{C1 + C2},$$

a vibration frequency of the filament travelling in the air layer located respectively between the common electrode and the first electrode of capacitance C1 and between the common electrode and the second electrode of capacitance C2.

A second device for performing said method is a device for the contactless measurement of the movement speed of an insulating filament. In the case of said device, the first flat conductor means have at least two common electrodes and the second flat conductor means have a first and a second pairs of electrodes forming, with their respective common electrode, a first and second capacitive dipoles arranged in parallel and at a distance D from one another, each electrode of said electrode pairs being rectangular and positioned perpendicular to the filament travel direction.

Advantageously, said device has processing means for determining the movement speed V defined by $V=D/\Delta T$, in which $\Delta T$ is a time shift between a first random signal $x(t)$ produced by the first capacitive dipole and a second random signal $y(t)$ produced by the second capacitive dipole and is determined on the basis of an intercorrelation relation $Cxy(T)$ between the first and second random signals defined by $Cxy(T)=Cxx(T-\Delta T)$.

A third device for performing this method is a contactless measuring device for the tension and movement speed of an insulating filament. In the case of this device, the first flat conductor means have a first, a second and a third common electrodes and the second flat conductor means have a first, a second and a third pairs of electrodes, each electrode pair forming with its respective common electrode a first, a second and a third capacitive dipole, the electrodes of the first and third capacitive dipoles having a rectangular shape and are positioned perpendicular to the filament travel direction and are able to ensure, with the aid of processing means, the determination of the movement speed of said filament, the electrodes of the second capacitive dipole placed between the first and third capacitive dipoles having in each case a complementary right-angled triangle shape and being able to ensure, with the aid of the processing means, the determination of the filament tension.

Moreover, with said device, the first, second and third common electrodes are produced on the same substrate and the first, second and third electrode pairs are produced on the same second substrate. In the same way, the first and second flat conductor means of the first, second and third performance devices can be screen process printed on an epoxy glass.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
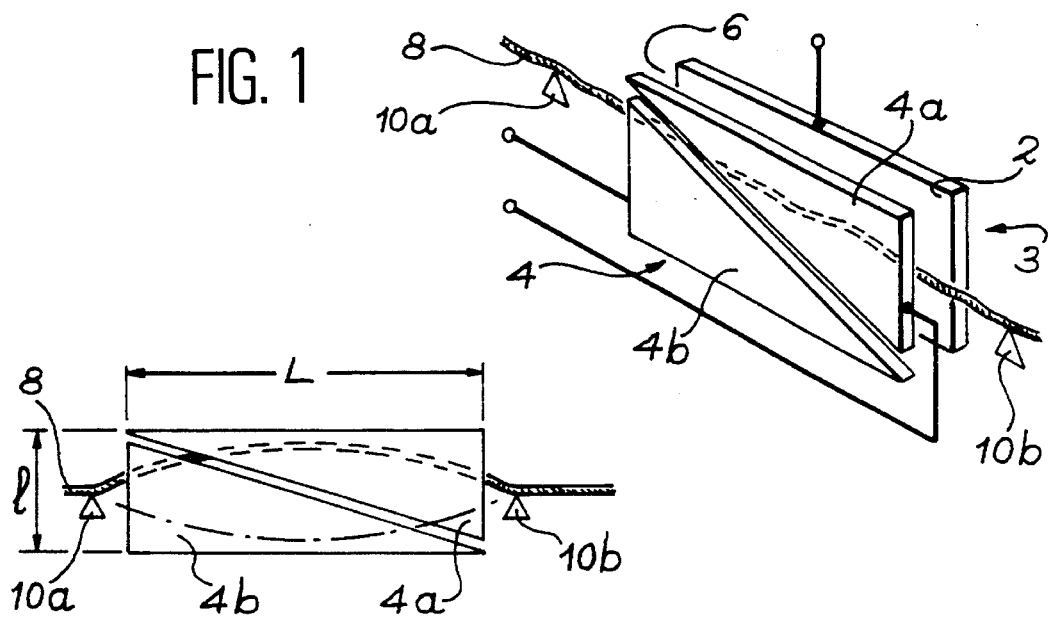
FIG. 1 is a perspective view of the insulating filament tension contactless measuring device.

FIG. 1 shows the device permitting the contactless measurement of the tension of an insulating filament during its movement. It is possible to see a sensor or transducer having two flat conductor means 2 and 4 separated by an air layer 6 (i.e. a dielectric layer). Between the said two flat conductor means 2 and 4 travels the insulating filament, thread or wire 8. Together these two flat conductor means 2,4 form air capacitances. The method according to the invention consists of analysing the disturbance to the permittivity of the=air layer 6 due to the movement of the filament 8 in said layer. Thus, the random fluctuations of the weight per unit length of the filament 8 travelling in the air layer 6 produce, over a period of time, random variations with respect to the capacitance value with respect to the flat conductor means 2 and 4

Advantageously, the flat conductor means 4 incorporate two electrodes 4a,4b, each of which is shaped like a right-angled triangle. These two right-angled triangles 4a,4b are complementary of one another and their hypotenuses are as close together as possible, but without sticking together. The existence of these two electrodes 4a,4b offers the advantage of permitting a measurement of the difference on the sum of the two capacitances C1,C2 (relative to the two electrodes 4a,4b) of the same dimension, which makes it possible to detect limited relative capacitance variations.

The flat conductor means 2 are also constituted by an electrode 2 referred to hereinafter as the common electrode. The structure constituted by the two electrodes 4a,4b and by the common electrode 2 will be referred to hereinafter as the capacitive dipole 3.

The two electrodes 4a,4b are screen process printed in the vicinity of one another onto the same substrate. The electrode 4a is supplied by a voltage −V and the electrode 4b by a voltage +V. The common electrode 2 then assumes the potential Vs with respect to earth or ground.

The method according to the invention consists of studying the oscillating frequencies of the filament when it is held taut between two fixed points in order to determine its tension. Thus, during its movement the filament vibrates without external excitation. However, this vibration is increased by guiding the filament across possible fixed points. According to an embodiment, these fixed points can be grooved pulleys or a V-guide. Moreover, said fixed points serve to prevent any contact between the filament and any of the electrodes, because such a contact would be liable to prejudice the free oscillation of the filament. These fixed points are very diagrammatically represented in FIG. 1 by triangles 10a,10b.

From the capacitive dipole 3 is obtained a signal whose spectrum is calculated. This spectrum reveals the fundamental mode and the harmonics of the signal. A spectral analysis by parametric modelling makes it possible to again find the filament tension.

Thus, during these vibrations, the filament 8 is largely located either in the space between the common electrode 2 and the electrode 4a, i.e. in the capacitance C1, or in the space between the common electrode 2 and the electrode 4b, i.e. in the capacitance C2. This position of the filament 8 in one or other of the spaces of the capacitive dipole 3 alternates every half-cycle of the filament vibration. This alternation effect occurs both for the fundamental mode and for certain harmonics of the signal. The signal obtained at the output of the dipole 3, namely the signal $$\frac{C1 - C2}{C1 + C2}$$

is modulated as a function of the oscillating frequency of the filament and therefore as a function of the tension of the filament 8.

Figures 2, 3:
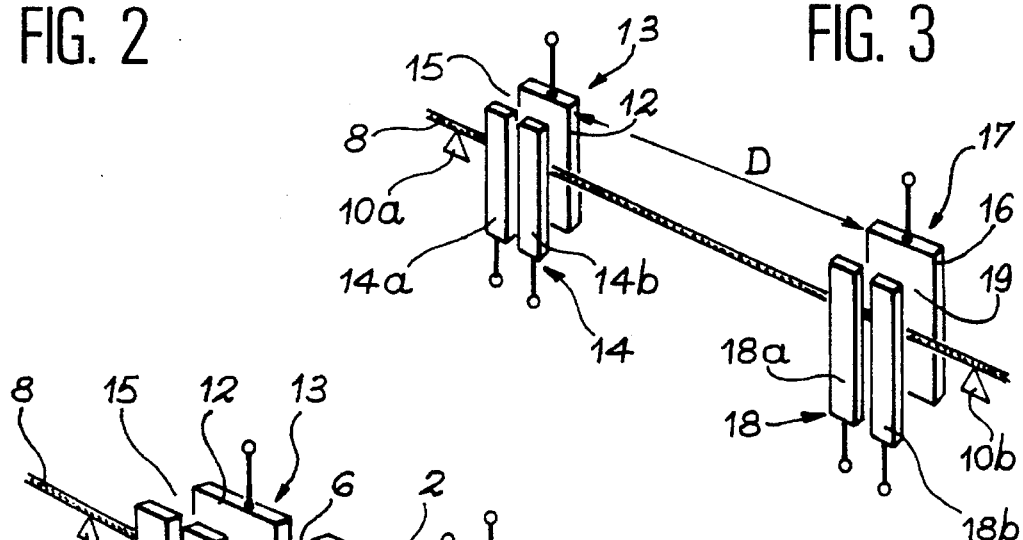
FIG. 2 is a front view of the same device on which are shown the vibrations of the filament during its movement.
FIG. 3 is a perspective view of the insulating filament movement speed contactless measuring device.

In a front view, FIG. 2 shows the said filament 8 when vibrating in the space 6 between the common electrode 2 and the electrodes 4a,4b. A double dotted line shows the filament 8 when it is largely located in the space between the common electrode 2 and the electrode 4a, which corresponds to the capacitance C1. The mixed line configuration shows the position of the filament 8 when it vibrates and is largely in the space between the common electrode 2 and the electrode 4b, which corresponds to the capacitance C2. It is also possible to see the filament guides 10a,10b making it possible to increase the natural vibration of the filament 8.

It is clear that in order to obtain a better sensitivity of the vibrations of the filament 8 in the space 6 between the electrodes 2 and 4a/4b, it is advantageous for the space between the hypotenuses of the electrodes 4a,4b to be as small as possible. In this case, the vacuum capacitance value C1 and C2 is:

$$C1 = C2 = \frac{po \cdot pr \cdot L \cdot l}{2e}$$

in which po and pr are respectively the permittivity of the vacuum, the relative permittivity of the ambient medium (close to 1 when the ambient medium is air) and e the distance between the common electrode 2 and the electrodes 4a,4b.

FIG. 3 shows the device making it possible to measure in contactless manner the travel speed of the filament 8. This device has two capacitive dipoles 13,17 separated by a fixed distance D. As in FIG. 1, each dipole 13, 17 has two flat conductor means respectively 12, 14 and 16, 18 separated by an air layer respectively 15 and 19.

More specifically, the flat conductor means 14 have two rectangular electrodes positioned perpendicularly to the direction of the filament 8. These two electrodes 14a,14b are raised to a respective potential +V and −V.

In the same way, the flat conductor means 18 have two rectangular electrodes 18a, 18b perpendicular to the direction of the filament 8 and parallel to the electrodes 14a,14b of the dipole 13. These electrodes 18a, 18b are respectively raised to the potential −V and +V.

On either side of the assembly constituted by the capacitive dipoles 13 and 17 are filament guides 10a, 10b, whose function was explained during the description of FIG. 1.

When the filament 8 passes into the first dipole 13, it produces a first random signal x(t). The random signal y(t) comes from the second dipole 17 and is identical to the random signal x(t), except that it has a time shift ΔT defined by the expression ΔT=D/speed.

The intercorrelation of the random signals x(t) and y(t) is written:

$$Cxy(T) = \frac{1}{To} \int_0^{To} x(t) \cdot y(t-T) \cdot dt.$$

Where $C_{xy}$ is the intercorrelation of the signals x and y, and $T_0$ is the duration of the signal obtained for calculating the intercorrelation.

For the device according to the invention y(t) is equivalent to x(t-ΔT), which makes it possible to simplify the expression giving the intercorrelation of the random signals x(t) and y(t) to Cxy(T)=Cxx(T-ΔT), the time shift ΔT being determined by the position of the peak or maximum of the intercorrelation $C_{xy}$ (T). When this time shift has been determined, the filament movement speed can be obtained from the expression speed=D/ΔT.

In order to make it possible to detect small longitudinal irregularities, the electrodes 12,16,14a/14b and 18a/18b are produced with limited widths.

Figure 4:
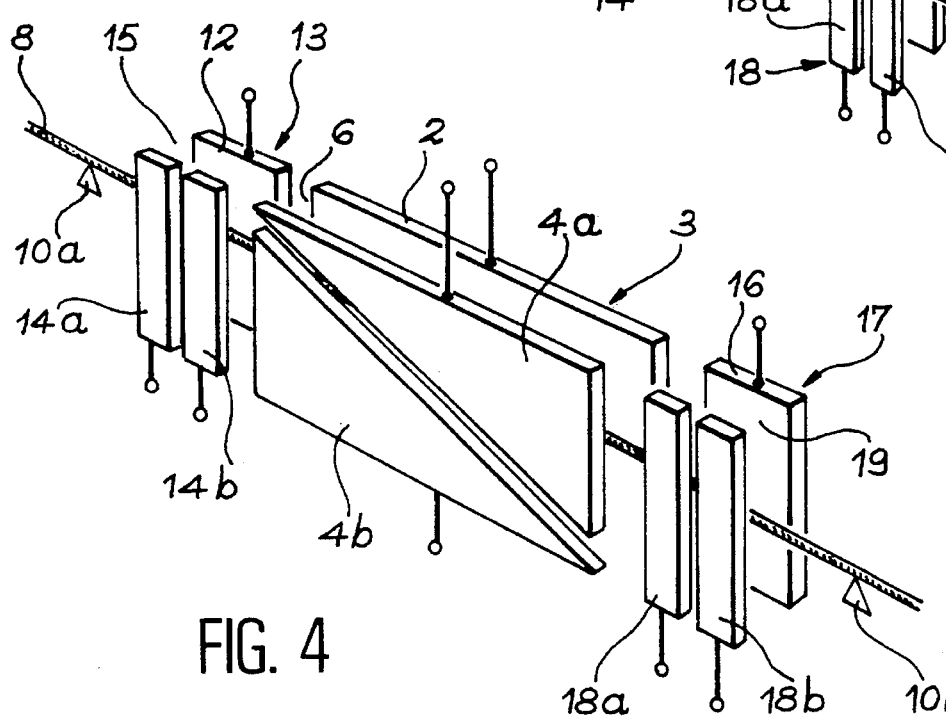
FIG. 4 is a perspective view of the complete device, i.e. the device making it possible to measure in contactless manner the tension and movement speed of the insulating filament.

FIG. 4 shows the complete device permitting the measurement of both the tension and the movement speed of the filament 8. This device has the dipole 3 of the filament tension measuring device and the dipoles 13, 17 of the filament movement speed measuring device. In said device, the dipoles 13 and 17 are positioned on either side of the dipole 3. Moreover, at each end of said array of dipoles 13, 3 and 17 are provided filament guides 10a and 10b. It is clear that each of these dipoles 3, 13 and 17 will not be described in greater detail because they are identical to the dipoles described respectively in FIGS. 1 and 3.

Advantageously, the electrodes 14a,14b,4a,4b and 18a and 18b are produced on the same substrate. In the same way, the common electrodes 12,2 and 16 are produced on the same substrate. Such a construction has the advantage of being simple to use, but more particularly it automatically compensates any mechanical deformations which would introduce capacitance variations. Thus, any deformation which occurred and affected one of the capacitances of a dipole would act in the same way on the dual capacitance of said dipole. Thus there is no system sensitivity loss.

According to an embodiment of the invention, these copper electrodes are screen process printed onto epoxy glass. The glass plates containing on the one hand the common electrodes 2,12 and 16 and on the other the electrodes 14a,14b,4a,4b,18a,18b are kept at a distance e from one another by an insulating plate of thickness e positioned below the flat conductor means. The assembly of said array takes place through three epoxy glass plates. The electric wires for connecting to each of the dipoles are twisted together.

Figure 5:
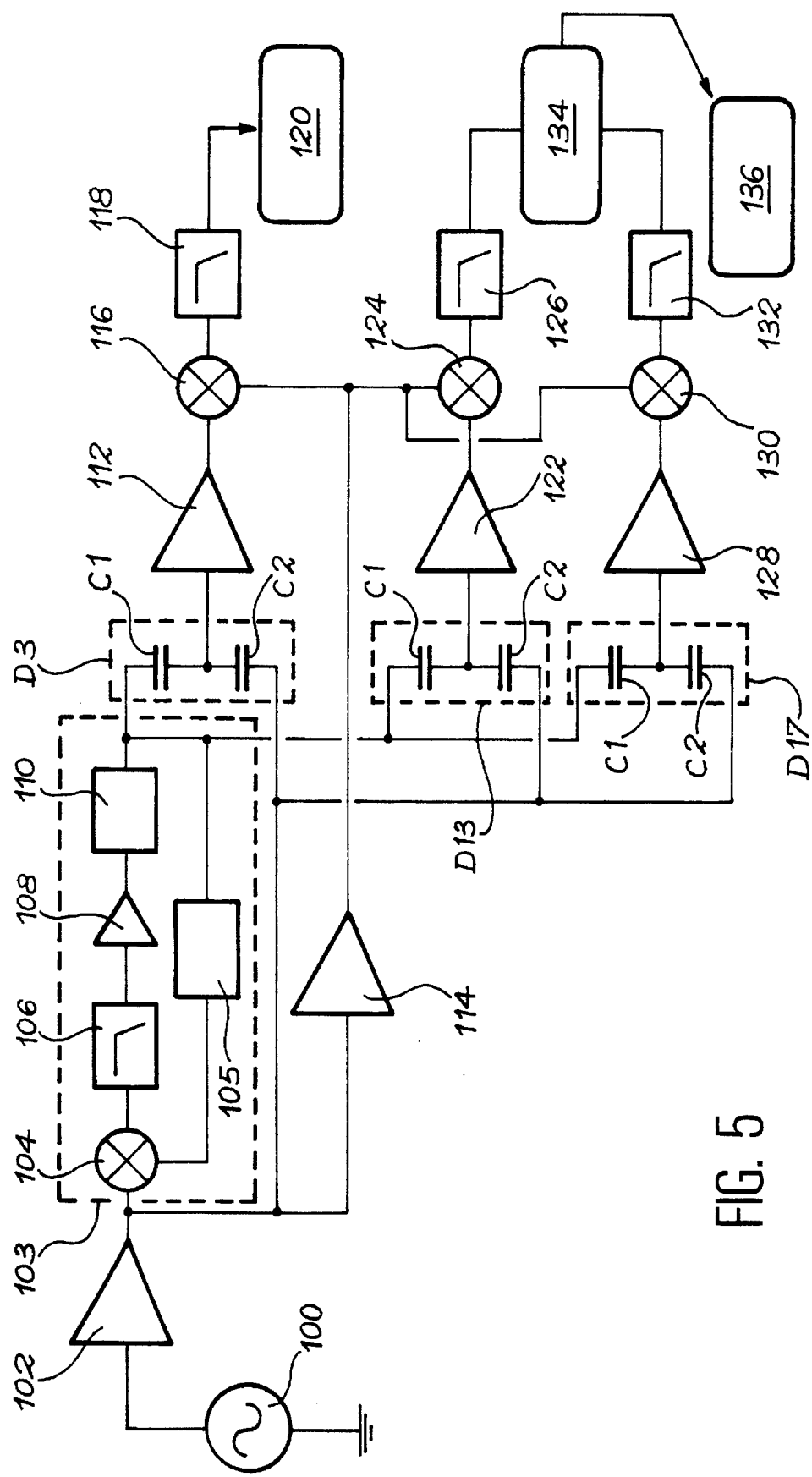
FIG. 5 is the synoptics of the latter device.

FIG. 5 shows in functional manner the synoptics of the device according to FIG. 4. In FIG. 5, the sinusoidal generator represented by the block 100 supplies the array of the device with sinusoidal signals. The signals from the generator 100 are amplified by the amplifier 102, whose input is connected at the output of said generator 100 and whose output is connected to a mixer 104. The signal from the amplifier 102 is of form V(t)=Sin(Wt). Via the mixer 104, it is introduced into a phase shift circuit Ø=π. The phase shift circuit is produced by means of a phase locked loop 103. Thus, the signal is introduced into the loop 103 by means of the mixer 104. It is then filtered by the low-pass filter 106 and is then again amplified by the amplifier 108 and is finally applied to the input of a voltage-controlled oscillator 110. At the output of said oscillator 110, the signal obtained has the value −V(t), i.e. sin(wt+π). This signal −V(t) is introduced into the return link of the loop 103 in order to undergo in 105 the phase shift of value π before being reintroduced into the mixer 104. This signal −V(t) obtained at the output of the block 110 excites one of the electrodes (e.g. the electrode 4a of capacitance C1) of the capacitive dipole D3 described in FIGS. 1 to 4 and in which it is designated 3. The second electrode of this capacitive dipole D3 (the electrode 4b of capacitance C2) is connected to the output of the amplifier 102 and is therefore excited by the signal +V(t). It is also connected to the capacitance C1 formed by the electrode 4a. These two capacitances C1 and C2 are bridge connected to the amplifier 112. The signal obtained at the output of said bridge is:

$$Vs(t) = \frac{C1(t) - C2(t)}{C1(t) + C2(t)} \sin(wt).$$

As the information of interest for determining the tension of the filament is contained in the amplitude of the signal Vs(t), an amplitude demodulation takes place by means of a multiplication of the signal Vs(t) by the pure sinusoid Sin(wt) of constant amplitude, said multiplication being carried out by the amplifier 112. The sought signal $$\frac{C1(t) - C2(t)}{C1(t) + C2(t)}$$

is then obtained by low-pass filtering of the high frequency sinusoidal component.

More specifically, the output of the amplifier 102 is connected to the input of an amplifier 114. The outputs of the amplifiers 112, 114 are connected to the mixer 116, whose output signal is filtered by a low-pass filter 118. The signal Vout(t) then obtained at the output of said filter 118 is the sought signal and has for expression:

$$Vout(t) = \frac{C1(t) - C2(t)}{C1(t) + C2(t)}.$$

Then, in 120 a spectral analysis of said signal Vout(t) is carried out and on the basis of this the filament tension value is determined.

Parallel to the capacitances C1 and C2 of the capacitive dipole D3, the capacitances C1 and C2 of the capacitive dipole D13 (13 in FIGS. 3 and 4) are respectively connected to the output of the loop 103 and to the output of the amplifier 102. These capacitances are also bridge connected to the input of the amplifier 122, whose output is connected to a mixer 124. The shape of the signals obtained at the output of the bridge connections of C1 and C2 has already been described in connection with the dipole D3 and will therefore not be described again for the dipoles D13 and D17. On a second input, the mixer 124 receives the signal from the amplifier 114. The signal obtained at the output of the mixer 124 is filtered in a low-pass filter 126 and then introduced into the intercorrelation circuit 134.

In the same way as for the capacitive dipole D13, the capacitances C1 and C2 of the capacitive dipole D17 (17 in FIGS. 3 and 4) are respectively connected to the output of the loop 103 and to the output of the amplifier 102. In the same way, these capacitances are bridge connected to the input of the amplifier 128. The output of the amplifier 128 is connected to one input of the mixer 130, which receives on a second input the signal from the amplifier 114. The output of the mixer 130 is connected to a low-pass filter 132. The signal obtained at the output of said filter 132 is introduced into the intercorrelation block 134, in which the function Cxy(t) is calculated. The circuit 136 makes it possible to determine the position of the intercorrelation peak and thus deduce therefrom the filament movement speed.

The synoptics of FIG. 5 correspond to a device permitting both the measurement of the tension and the measurement of the movement speed. However, it is clear that the synoptics of the device for the measurement of the tension will be described by the references D3 and 100 to 120 and the device for measuring the movement speed by the references 100 to 110, 114, D13, D17 and 122 to 136.

We claim:

1. Method for the contactless measurement of tension of an insulating filament (8) with the aid of at least one contactless sensor (3,13,17), said sensor having first and second flat conductor means (2,4*a*/4*b*) separated by an air layer (6) of permittivity po in which the filament travels, comprising the step of determining disturbances to the permittivity of the air layer due to fluctuations of the weight per unit length and the position of the insulating filament during its movement in said air layer.

* * * * *